United States Patent Office 3,312,308
Patented Apr. 4, 1967

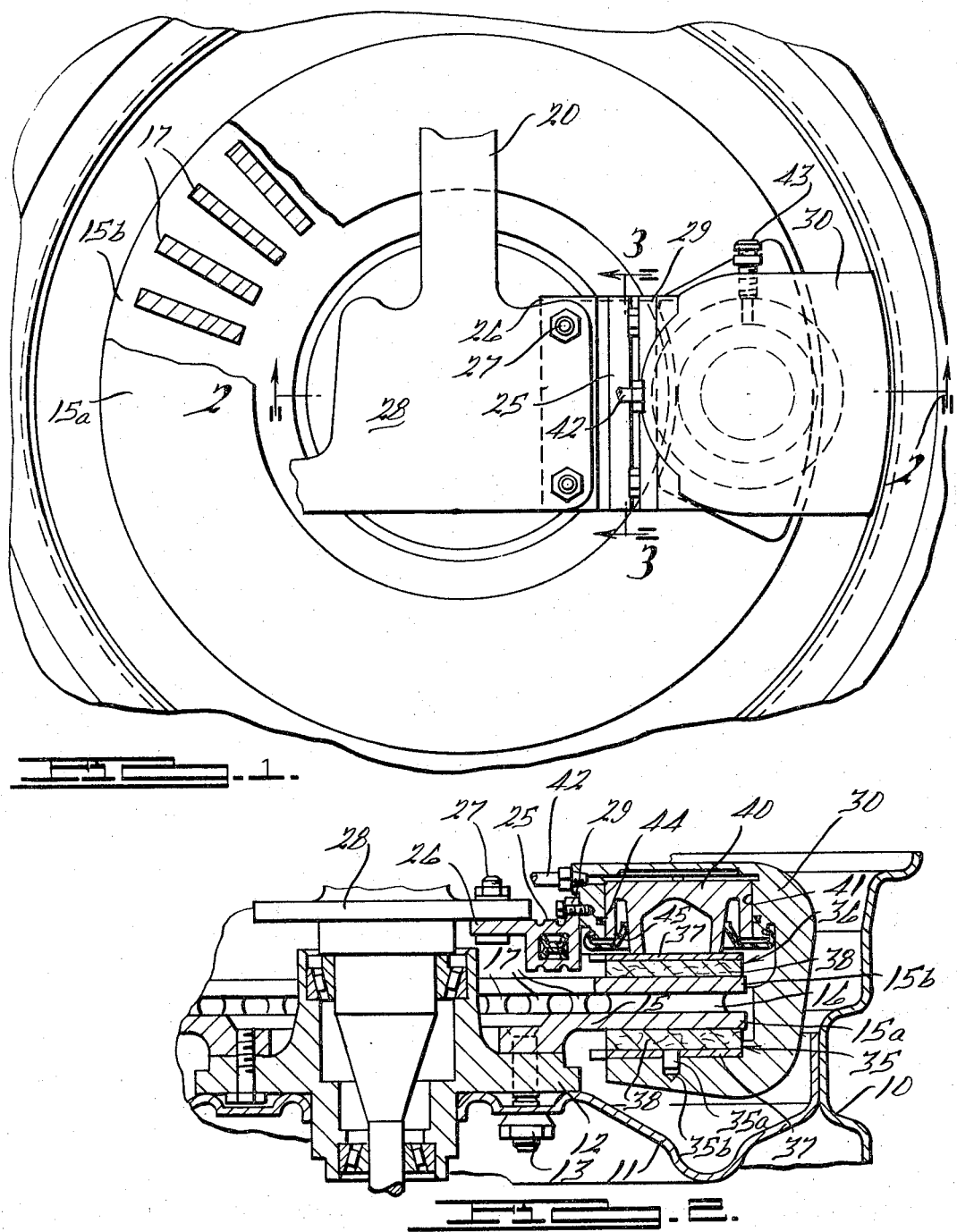

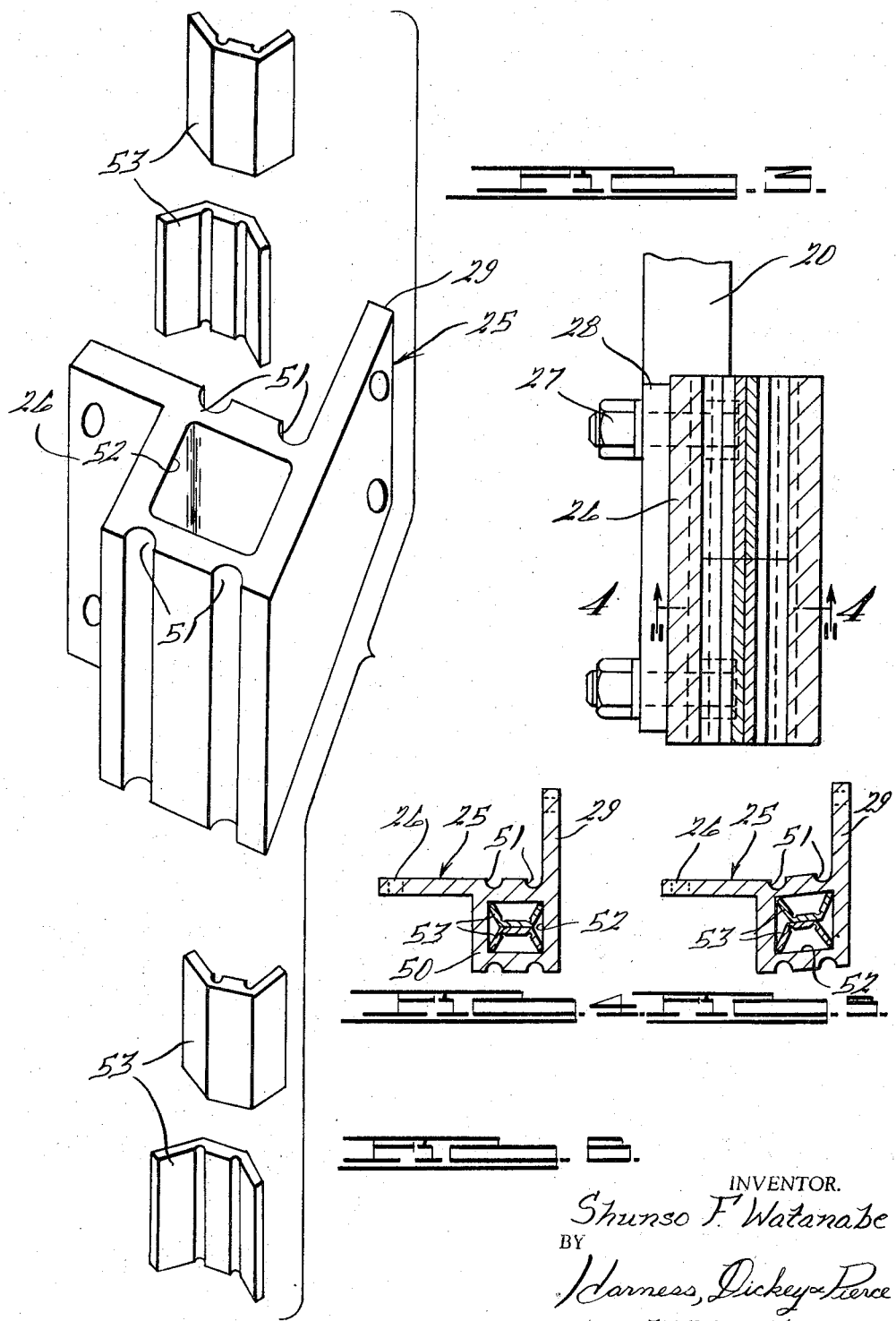

3,312,308
DISK BRAKE
Shunso F. Watanabe, Livonia, Mich., assignor to Kelsey-Hayes Company, Romulus, Mich., a corporation of Delaware
Filed Oct. 21, 1965, Ser. No. 499,676
5 Claims. (Cl. 188—72)

This invention relates to brakes and, more particularly, to improvements in disk brakes adapted to simplify, render more efficient, and improve the same generally.

One of the important objects of the invention is to provide a disk brake in which the torque member which supports the caliper-like housing or yoke is relatively stiff in the torque direction and relatively flexible in the direction of the axis of the wheel to continuously position the caliper during the operation of the brakes.

Another object of the invention is to provide a torque member which permits lateral movement of the caliper upon the exertion of a predetermined force at the friction pads of the brake and which will periodically take a new set to properly position the caliper and brake shoes as the brake shoe linings become worn.

Another object of the invention is to provide a torque member having a part thereof rectangular in cross section and in the form of a parallelogram having high stress areas or thinner bendable portions adjacent the corners thereof, and a pair of channel shaped friction members arranged in back-to-back relation in said torque member and press fitted therein to contact the corners of the torque member and each other. With this construction, the torque member will periodically take a new set as the brake shoe linings become worn, so as to properly position the caliper member, whereby to automatically take up excessive clearance between the brake shoe linings and the brake disk.

Other objects of this invention are to provide a simplified form of disk brake which may be economically manufactured; which may be quickly and easily assembled and installed; and in which maintenance costs are reduced to a minimum.

The various objects and advantages, and the novel details of construction of one commercially practical embodiment of the invention, will become more apparent as this description proceeds, especially when considered in connection with the accompanying drawings, in which:

FIGURE 1 is a rear elevational view of a disk brake constructed in accordance with this invention and mounted on a wheel;

FIGURE 2 is an enlarged fragmentary sectional view taken substantially on the plane indicated by line 2—2 in FIGURE 1;

FIGURE 3 is a fragmentary sectional view taken substantially on the plane indicated by line 3—3 in FIGURE 1;

FIGURE 4 is an enlarged sectional view of the torque member;

FIGURE 5 is a similar view showing the torque member after it has taken a new set; and FIGURE 6 is a separated perspective view of the parts of the torque member.

The brake of this invention is shown as being associated with a vehicle wheel having a rim 10 and a wheel body 11 secured to the axle flange 12 by means of studs or bolt and nut assemblies 13.

Also secured to the axle flange 12, as for instance by means of the same stud or bolt and nut assemblies 13, is a brake disk 15. In the form of the invention illustrated, the brake disk 15 is formed with a pair of spaced walls 15a and 15b. The brake disk is provided with a plurality of radially extending apertures or openings 16 and the webs 17 therebetween function as fan blades and serve to move cooling air in a radially outward direction between the walls 15a and 15b when the brake disk is rotated. This serves to reduce the heat generated by the engagement of the brake shoes with the brake disk, as will be apparent.

If the wheel to which the brake is applied is the front steering wheel of the vehicle, it is provided with at least one arm 20 adapted to be connected to the steering linkage (not shown).

The reference character 25 indicates generally a torque member which is provided at one end with an arm or flange 26 which is attached by a bolt 27 to a fixed part 28 of the axle structure. The other end of the torque member is provided with an arm or flange 29 which is connected to a caliper member 30 which is in the form of a C-shaped housing or yoke member; see FIGURE 2. This caliper member straddles at least a portion of the periphery of the brake disk 15, as will be apparent from an examination of FIGURE 1.

Mounted within the yoke member 30 is a pair of brake shoes 35 and 36, each comprising a backing plate 37 and a brake lining 38. The brake shoe 35 may be attached or keyed to the adjacent leg of the caliper member 30 by means of a stud 35a entering a recess 35b.

One leg of the C-shaped caliper member or yoke 30 engages the brake shoe 35 and the other brake shoe is adapted to be moved into braking position by means of a piston 40 slidably mounted in a bore or cylinder 41 in the caliper member 30. Fluid under pressure is supplied to the cylinder 41 behind the piston 40 through an inlet conduit 42. The reference character 43 indicates a bleed opening for the cylinder; see FIGURE 1.

The piston 40 is provided with an annular seal 44 which may be and preferably is in the form of an O-ring. This restricts the free movement of the piston 40 and also seals the periphery thereof. An annular flexible boot 45, formed of rubber, canvas, or any other suitable flexible material, may be provided to close the clearance between the piston 40 and the cylinder 41 to exclude therefrom dust or other foreign material.

The present invention relates more particularly to the construction and arrangement of the torque member 25 which mounts the caliper on the fixed part 28 of the wheel structure. This torque member comprises a part rectangular in cross section to form a parallelogram having high stress areas or bendable areas adjacent the corners thereof and a pair of channel-shaped friction members arranged in back-to-back relation inside the torque member and press fitted therein to contact the corners of the torque member and each other. Therefore, this torque member constitutes a flex unit which permits lateral movement of the caliper upon the exertion of a predetermined force, as, for instance, in the order of 100 pounds at the friction pads of the brake. Also, this member is designed so that it remains substantially in its deflected position due to the permanent set at the corners thereof and the friction between the backs of the channel members arranged therein.

As an example, when the caliper has been moved .020 inch, the inherent resiliency in the torque member will cause it to spring back .003 inch so as to clear the brake shoes from contact with the brake disk.

As shown in FIGURES 2, 4 and 5, the torque member 25 is provided intermediate its length with a hollow box-like portion 50 provided with grooves or bendable areas 51 adjacent its corners so that when it is deformed or bent, it acts as a parallelogram. The grooves 51 constitute high stress areas so that when the caliper 30 is moved, due to the application of the brakes, the torque member will move from the position illustrated in FIGURES 2 and 4 to that illustrated in FIGURE 5.

Arranged within the hollow interior 52 of the torque member is a pair of channel sections 53. These channel sections are arranged in back-to-back relation in the torque member and are press fitted therein to contact the corners of the torque member and each other. When the torque member is moved to the position illustrated in FIGURE 5, the friction channel-shaped members 53 will move from the position illustrated in FIGURE 4 to that illustrated in FIGURE 5. Thus, these friction members add to the resistance of the torque member to deform and also assist in maintaining the caliper at substantially its deflected position.

In practice, these channel members 53 may be made of soft brass and the torque member itself could be made of aluminum, in which case it could be extruded.

As shown in FIGURE 6, which is a separated perspective view of the torque member, the channel-shaped sections 53 may be formed as two pairs or sections, so that one pair may be inserted within the interior 52 of the torque member from one end and the other pair from the other end. As mentioned, these channel sections are press fitted into the interior 52 so as to contact the corners of the hollow interior 52 and each other.

With this construction, the caliper 30, when it is deflected upon application of the brakes, will cause the torque member to take a permanent set at the thinned portions 51 thereof and to be held in this deflected position due to the friction between the backs of the channel members 53. However, as mentioned heretofore, when the brakes are released, the torque member 25 will spring back a few thousandths of an inch to provide a clearance between the brake shoes and brake disk.

The present invention provides a sturdy, economical and readily assembled construction which may be economically manufactured. Thus, the herein described construction adapts itself for mass production.

While one commercially practical embodiment of the invention has been described and illustrated herein somewhat in detail, it will be understood that various changes may be made as may come within the purview of the accompanying claims.

What is claimed is:

1. In a disk brake for a wheel having a stationary part, a brake disk secured to said wheel for rotation therewith, a caliper straddling at least a portion of the periphery of said brake disk, a pair of opposed brake shoes, and means carried by said caliper for actuating said brake shoes, that improvement which comprises a torque member having one end connected to said stationary wheel part and having its free end connected to said caliper, said torque member comprising a hollow part having spaced bendable areas, and friction members press fitted in said torque member and engaging said torque member adjacent said bendable areas and frictionally engaging one another to control the deformation of said torque member.

2. In a disk brake for a wheel having a stationary part, a brake disk secured to said wheel for rotation therewith, a caliper straddling at least a portion of the periphery of said brake disk, a pair of opposed brake shoes, and means carried by said caliper for actuating said brake shoes, that improvement which comprises a torque member having one end connected to said stationary wheel part and having its free end connected to said caliper, said torque member comprising a part rectangular in cross section to form a parallelogram having bendable areas adjacent the corners thereof, and a pair of friction members in said torque member and pressed fitted therein to contact the corners of the torque member and frictionally engaging one another to control the deformation of said torque member.

3. In a disk brake for a wheel having stationary part, a brake disk secured to said wheel for rotation therewith, a caliper straddling at least a portion of the periphery of said brake disk, a pair of opposed brake shoes, and means carried by said caliper for actuating said brake shoes, that improvement which comprises a torque member having one end connected to said stationary wheel part and having its free end connected to said caliper, said torque member comprising a part rectangular in cross section to form a parallelogram having high stress areas adjacent the corners thereof, and a pair of channel-shaped friction members arranged in back-to-back relation in said torque member and press fitted therein to contact the corners of the torque member and each other.

4. In a disk brake for a wheel having a stationary part, a brake disk secured to said wheel for rotation therewith, a caliper straddling at least a portion of the periphery of said brake disk, a pair of opposed brake shoes, and means carried by said caliper for actuating said brake shoes, that improvement which comprises a torque member having one end connected to said stationary wheel part and having its free end connected to said caliper, said torque member comprising a hollow part substantially rectangular in cross section having bendable areas adjacent the corners thereof, and a pair of friction members press fitted in said torque member to contact the corners thereof and frictionally engaging one another to control the deformation of said torque member.

5. In a disk brake for a wheel having a stationary part, a brake disk secured to said wheel for rotation therewith, a caliper straddling at least a portion of the periphery of said brake disk, a pair of opposed brake shoes, and means carried by said caliper for actuating said brake shoes, that improvement which comprises a torque member having one end connected to said stationary wheel part and having its free end connected to said caliper, said torque member comprising a hollow part substantially rectangular in cross section having relatively thin bendable areas adjacent the corners thereof to permit a parallelogram deformation thereof, and a pair of channel-shaped friction members arranged in back-to-back relation in said torque member and press fitted therein to contact the corners of the torque member and frictionally engaging one another to control the deformation of said torque member.

No references cited.

MILTON BUCHLER, *Primary Examiner.*

G. E. HALVOSA, *Assistant Examiner.*